United States Patent [19]

Sauerschell et al.

[11] Patent Number: 4,505,151

[45] Date of Patent: Mar. 19, 1985

[54] POSITION INDICATOR WHICH CAN BE COUPLED TO A GAS PEDAL IN ORDER TO CONTROL THE SPEED OF TRAVEL OF AN AUTOMOTIVE VEHICLE

[75] Inventors: Wolfgang Sauerschell, Oberursel; Gerhard Ruschek, Hattersheim; Arnold Mann, Biebergemünd, all of Fed. Rep. of Germany

[73] Assignee: VDO Adolf Schindling AG, Frankfurt am Main, Fed. Rep. of Germany

[21] Appl. No.: 487,536

[22] Filed: Apr. 22, 1983

[30] Foreign Application Priority Data

Apr. 23, 1982 [DE] Fed. Rep. of Germany ....... 3215167

[51] Int. Cl.[3] .......................................... G01M 15/00
[52] U.S. Cl. ...................................................... 73/116
[58] Field of Search ............... 73/116, 117.3, 118; 74/866, 870, 871, 877; 123/472, 494

[56] References Cited

U.S. PATENT DOCUMENTS 4,392,375  7/1983  Eguchi et al. ........................ 73/118
4,417,468  11/1983  Yasuda et al. ...................... 73/118

Primary Examiner—Jerry W. Myracle
Attorney, Agent, or Firm—Martin A. Farber

[57] ABSTRACT

A position indicator which can be coupled to a gas pedal has a housing with a substantially cylindrical hollow inner space. A rotary resistor is arranged fixed against turning in a mount which can be fastened to the housing. A setting shaft for the rotary resistor is connected with a drive shaft of the position indicator so as to be actuated by a turning movement of the drive shaft. The drive shaft and the setting shaft are turned back by at least one restoring spring when the gas pedal is released. A member connected with the drive shaft serves to accommodate the restoring springs and for the arrangement or development of an actuating member for a kick-down switch. In order to be able to adapt the position indicator in diversified fashion to desired restoration characteristics and required characteristic curves of the rotary resistor and to facilitate the final mounting of the position indicator, the latter consists of a first mechanical assembly and a second electrical assembly which can be inserted one after the other into the housing. Upon the insertion of the second electrical assembly the two assemblies are axially aligned with each other. The setting shaft and the member connected with the drive shaft can thus automatically couple with each other.

15 Claims, 21 Drawing Figures

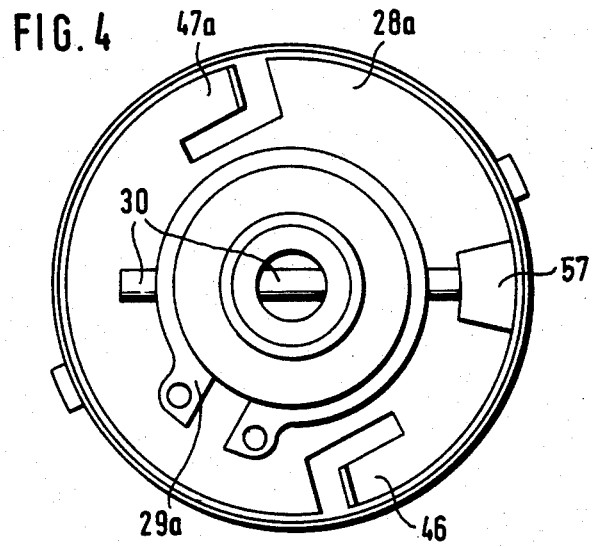
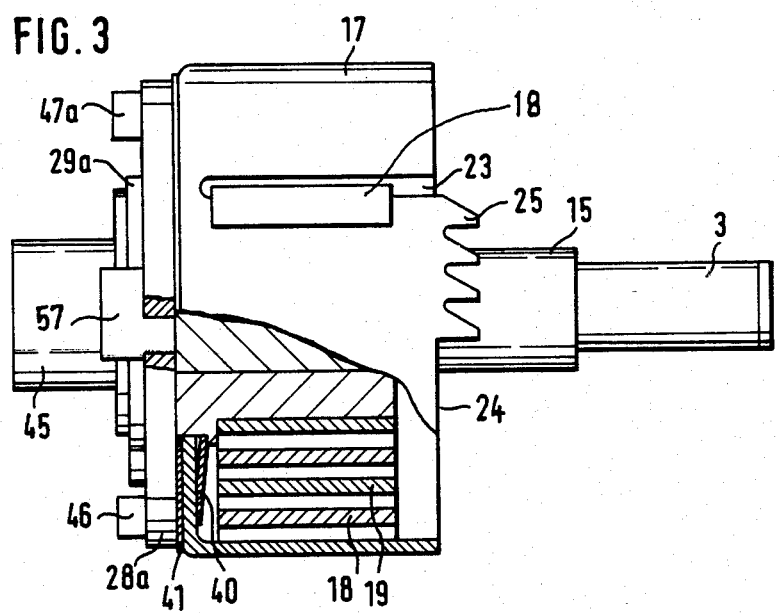

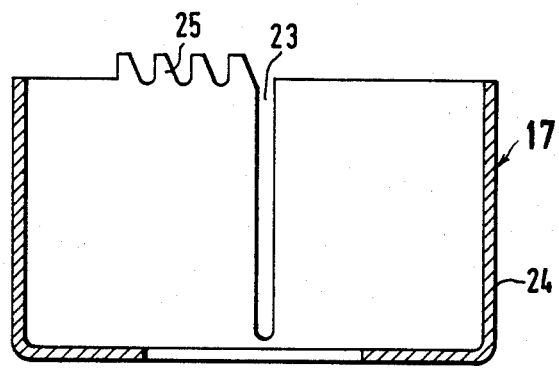
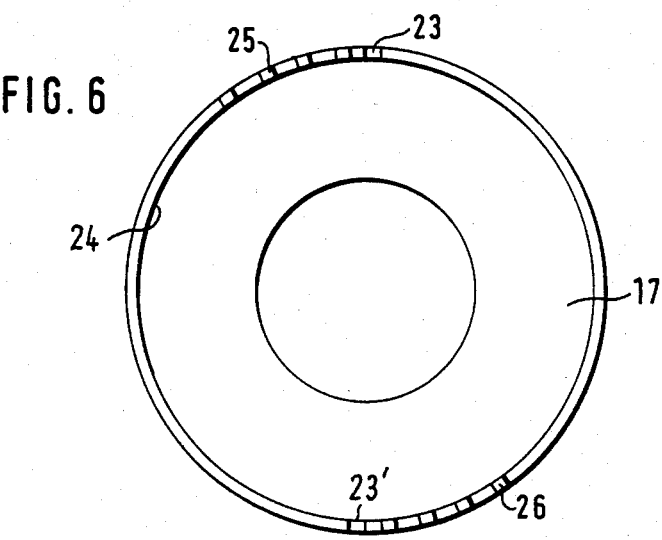
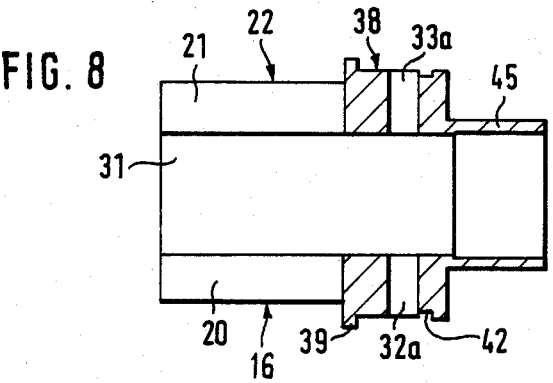

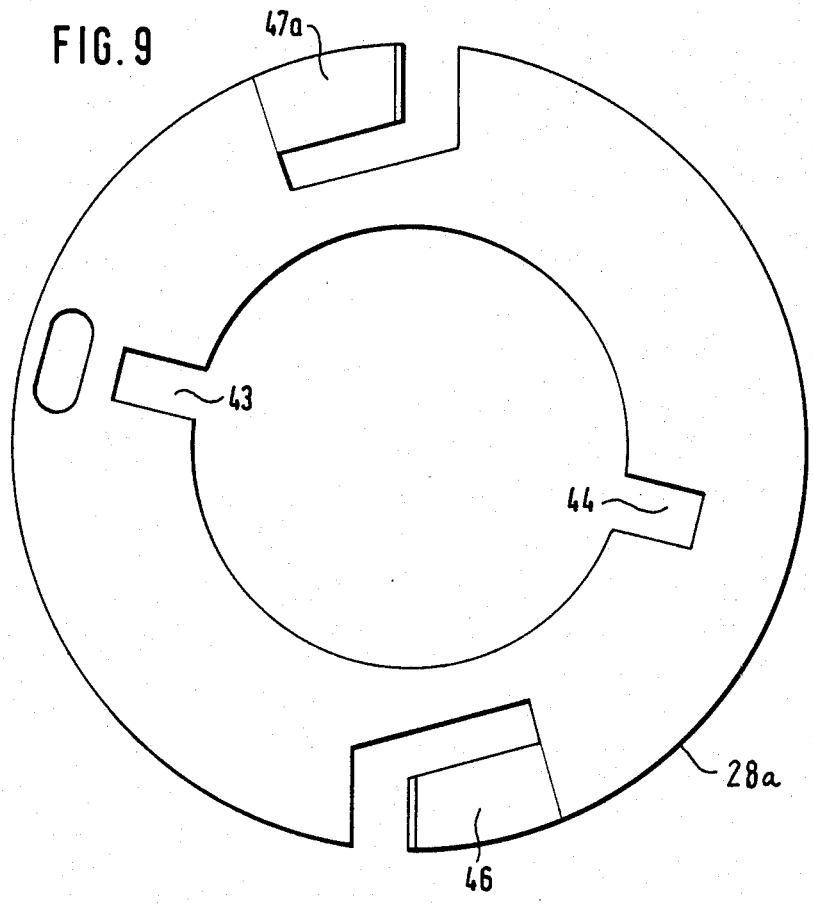

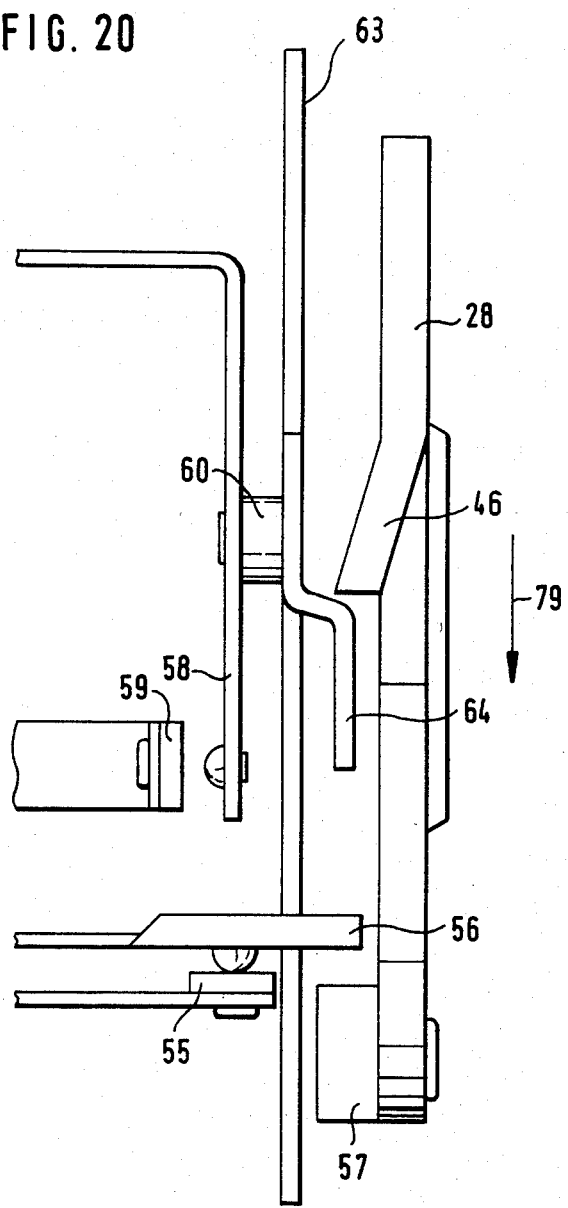

POSITION INDICATOR WHICH CAN BE COUPLED TO A GAS PEDAL IN ORDER TO CONTROL THE SPEED OF TRAVEL OF AN AUTOMOTIVE VEHICLE

The present invention relates to a position indicator which can be coupled to a gas pedal in order to control the speed of travel of a automotive vehicle by electric transfer of the movement of the gas pedal to an element which controls the fuel/air mixture, particularly a throttle valve, having a housing with a substantially cylindrical hollow inner space within which one of the two parts movable relative to each other of a rotary resistor is arranged, secured against turning, in a mount which can be fastened to the housing while the other part is connected with a member which is mounted turnably in the cylindrical hollow inner space and can be turned against the force of at least one return spring by the gas pedal and is provided with actuating means by which an electric kick-down switch which is connected with the housing can be actuated in axial direction upon the turning of said member by a predetermined amount.

An electric signal is produced by such position indicator as a function of the position of the gas pedal. The electric signal is compared in a comparator with a restoration variable corresponding to the position of the throttle valve and fed via a control amplifier to a setting member which actuates the throttle valve in accordance with a predetermined characteristic curve as determined by the position of the gas pedal. Such devices are also known under the name of "electric gas." The position indicator can also be used to regulate the speed of travel of an automotive vehicle if the electric signal given off by the position indicator is compared with a guide variable which corresponds to the desired speed of travel and this first comparison signal is fed to the second comparator within which the comparison with the return variable is effected.

In the desire to create compact and reliable position indicators, a position indicator of the aforementioned type is known which consists essentially of a rotary resistor arranged in a cylindrical housing. The rotary resistor is arranged in detail in a tubular mount having two sections of different diameter, which mount can be clamped by a collar between one end of the housing and the floor. The setting shaft of the rotary resistor is extended out of the cylindrical mount, specifically from its section of smaller diameter, and is connected to a bell-shaped body which is turnably mounted in the cylindrical hollow inner space of the housing. For this purpose, the bell-shaped member passes at its closed end into a concentric stub shaft which extends out of the housing through an opening in it. On the stub shaft a swing arm having a spherical head for the coupling of the gas pedal is arranged. In the space between the bell-shaped member and the tubular mount two restoring springs are arranged, one of which extends at one end into a hole in the collar and at the other end into a hole in the end surface, while the other return spring extends at one end into a hole in the tubular mount and at the other end into a hole in the end surface. In this way the bell-shaped member can be set back with the setting shaft of the rotary resistor to the idling position until the swing arm or a part connected with it strikes against a stop. In order, in the end position of the swing arm opposite the idle position, to activate a kick-down switch by which a different speed range of an automatic transmission can be engaged, one end of the bell-shaped member is functionally connected to a movable contact spring of the kick-down switch which is arranged on the cover of the housing. In order to deflect the bell-shaped member axially into kick-down position, a ball is arranged between the one end of the bell-shaped member and the wall of the housing facing it, said ball being supported, fixed in space, in a recess in one of the two parts which are movable relative to each other and engaged in a groove having the shape of an annular sector in the other part. In this way the bell-shaped member is pressed axially away from the wall of the housing when the ball rolls out of the annular sector-shaped groove in the kick-down position of the bell-shaped member. In this known position indicator the manufacture of individual parts, in particular the bell-shaped member which extends over practically the entire inner surface of the housing and is provided with the annular sector-shaped groove on its front is expensive. This is all the more true when the stub shaft forms a single unit with the bell-shaped xember. The tubular mount with a collar and two sections of different diameter also is the cause of considerable expense. The mounting of the rotary resistor in the mount and of the mount together with the springs in the bell-shaped member is relatively difficult. By this structural unit the mechanical characteristic curves—restoring force of the return springs via the movement of the gas pedal—and the electrical characteristic curves—resistance of the rotary resistor or signal given off by it as a function of the position of the gas pedal or of the swing arm are positively established. Since different mechanical or electrical characteristic curves may be required for different types of vehicles, a correspondingly large number of types must be produced and kept in stock.

Furthermore, this known position indicator lacks a safety switch which is developed in particular as a lock and is locked when the gas pedal is moved out of its idle position. Such a safety switch has already become known in order, in combination with a setting member contact, to reduce the speed of rotation of a drive motor when a disturbance is present and the drive motor gains in speed despite the fact that the gas pedal is in the idle position. Therefore, the dependability in operation of the motor control is increased by the safety switch.

The present invention therefore includes the task of developing a position indicator with kick-down switch and, as a further development, also with limit switches, in such a manner that it, consisting of substantially independent assemblies and adaptable in various ways to the required conditions, can be easily premounted, tested and assembled to form the complete position indicator.

This object is achieved by the invention in the manner that a first assembly (12) comprises a drive shaft (15) which can be coupled with the gas pedal, the shaft passing through a pot (17) which receives the return springs and being turnable with respect to said pot; that one end of the return spring(s) extends into a (respective) slot (23) of the pot (17) and the other end is connected with the drive shaft; that one end of the drive shaft (15) located within the housing can be coupled to the turnable part (setting shaft 49) of the rotary resistor (48) in an axial direction; that a switch disk (28, 28a) for actuating the kick-down switch (contact springs 59, 60) is connected via said end with the drive shaft (15); that a second assembly (13) comprises a hollow insulating base (47) whose hollow space receives the rotary resistor (48) in non-turnable manner and which serves as end mount for the contact springs (59, 60) of the kick-down switch in such a manner that one of the contact springs which can be actuated by the switch disk (28, 28a) protrudes from the insulating base, and a spring washer (63) with central bushing (75) is so arranged that a part of the rotary resistor (48) which surrounds the turnable part (setting shaft 50) can be inserted through the end (51) of the insulating base; that the first assembly (12) can be inserted secured against turning in the housing (1) in such a manner that a section (3) of the drive shaft passes through a borehole in the bottom of the housing, and that the second assembly (13) can by means of the turnable part of the rotary resistor (setting shaft 50) be inserted coaxially to the drive shaft (15) into the housing and be fastened in it.

This position indicator has the important advantages that the first assembly having the essentially mechanical parts, namely the return springs, and having a spring washer as the actuating member of the kick-down switch and an additional safety switch which is possibly present can be premounted and tested as an independent unit. The same applies to the second assembly having a hollow insulating base on which the electric components are arranged, particularly the rotary resistor in a hollow space of the insulating base as well as the contact springs of the kick-down switch and, if present, of the safety switch. The final assembly is effected in the manner that first of all the first mechanical assembly is inserted, fixed against turning, into the housing, a section of the drive shaft extending through a bore in the bottom of the housing. Thereupon the second assembly is inserted into the housing with the turnable part of the rotary resistor coaxial to the drive shaft and fastened in it. Since during the insertion, coupling takes place simultaneously between the turnable part, namely a setting shaft of the rotary resistor, and the drive shaft and since the switch disk is brought into the desired position with respect to the contact springs, the functional coupling of the cooperating components of the first and second assemblies is thus also automatically obtained.

Furthermore, according to the invention the spring washer (63) is developed with extensions (64, 65) bent twice at a right angle and spaced axially from it which rest against the switch disk (28) in order to fix the axial position of the first assembly (12) and one of which is so arranged in the circumferential direction with respect to the actuatable contact spring (58) and a tongue (46, 47a) on the switch disk that in one end position of the drive shaft it actuates the contact spring (58) while at the same time increasing the restoring force to that of the return springs.

By the further development of the position indicator with the spring washer developed in the manner indicated, a two-fold function is exerted by simple means, namely the actuating of the kick-down switch with simultaneous increase of the restoring force to be overcome as well as the fixing in axial position of the first assembly. For the deforming of the spring washer in axial direction by mean of the perpendicularly bent extensions the switch disk is developed as follows: The switch disk (28, 28a) has at an acute angle two outwardly bent tongues (46, 47) by which the extensions (64, 65) of the spring washer can be actuated in the kick-down position of the drive shaft.

If the spring washer (63) has slots (70, 71) for fastening the second assembly (13) to protruding parts (72, 73) of the inner wall of the housing, then the spring washer further acts in suitable manner for the fastening of the second assembly, namely the electric assembly, in the housing, whereby at the same time the first assembly is, as indicated above, fixed in axial direction.

In particularly advantageous manner the restoring force exerted by the return springs can be preset as follows: the pot (17) has in the extension of its wall surface at least one serrated section (25, 26) which can engage in adjustable rotary position to the housing in a structured groove (27) in the inner surface of the bottom of the housing. For this it is merely necessary, when inserting the first assembly, to turn the pot to such an extent that with the swing arm resting against a stop the desired restoring force is present in order then to push the serrated section of the pot axially into the structured groove and engage it therein.

The mounting of the elements of the first assembly on the drive shaft is substantially facilitated by the sleeve which is displaceable on the latter, in the following manner: A sleeve (16) which can be pushed over the drive shaft (15) has an inner section (22) with at least one slot (20, 21) which is arranged in the pot (17) with the return spring (18, 19), one end of which extends into the slot, an outer section (38) for applying the switch disk and a taper (45) which can be inserted into the bushing (75) of the spring washer and is turnable in it; into the one end of the sleeve on the taper a part (bushing 50) of the rotary resistor (48) can be inserted with the setting shaft (49) while into the other end of the sleeve (16) on the inner section the drive shaft can be inserted, and the sleeve, the drive shaft and the switch disk can be connected with each other by a pin (30) which extends radially through the sleeve and protrudes out of it. The inner section of the sleeve is so developed that it takes up the restoring force of the return spring. On the outer section there are applied in particular the switch disk and the elements which fix the switch disk in position. A tapered end of the sleeve is provided for the turnable mounting of the sleeve with a drive shaft in a bushing of the spring washer. This second bearing point is relatively free of friction as compared with the bearing of the drive shaft in the bottom of the housing. A part of the rotary resistor with the setting shaft extends furthermore into the taper of the sleeve.

Furthermore, in accordance with the invention a shoe (52) is developed from the setting shaft (49) with which shoe the pin (30) can be coupled upon the insertion of the setting shaft into the sleeve (16).

This setting shaft is advisedly developed with this shoe which forms a coupling with a pin which extends through the sleeve. The pin is furthermore adapted to connect the drive shaft with the sleeve and fasten the switch disk in circumferential direction on the latter.

The sleeve is turnable by the drive shaft in the pot the serrated section of which is held fast in the housing. The switch disk, on the other hand, turns due to the pin connection together with the sleeve. In order to position axially the elements which are rotatable with the drive shaft and those which are not rotatable, the following means are provided: The sleeve (16) has a collar (39) between the inner section (22) and the outer section (38), against which collar a cup spring (40) rests and presses a bottom of the pot via a friction disk (41) against the switch disk (28a); the end of the outer section facing away from the collar is developed with a groove (42) into which a snap ring (29a) can be inserted in order to fix the axial position of the switch disk. In this way the result is obtained that the bottom of the pot is pressed on the outside towards the switch disk, a friction disk which takes up the frictional forces being arranged between the switch disk and the bottom of the pot.

Suitable features of the development of the hollow insulating base are as follows:

The insulating base (47) serves to hold contact springs (55, 56) of a safety switch, one contact spring (56) of which protrudes axially from the front of the mount, the protruding contact spring (56) being adapted to be actuated in circumferential direction by a cam (57) arranged on the switch disk.

The switch disk (28) is arranged on extensions (61, 62) developed on the front face of the insulating base.

The insulating base (47) has an approximately parallelepiped recess to receive the similarly shaped rotary resistor (48).

If a circuit board (53) is placed on the rotary resistor in the insulating base (47), then the contacting of the electrical elements in the insulating base with a cable which extends outward from the housing is facilitated.

The invention will be explained below with reference to the drawings in which two preferred embodiments of the positionindicator of the invention are shown. With the exception of FIG. 2, which shows a first variant, all the other figures show the second variant, the two variants, however, being identical, except for the differences indicated below.

FIG. 3 is a side view, partially in section, of a first mechanical assembly;

FIG. 4 is a view of the rear side of the first mechanical assembly;

FIG. 5 is a longitudinal section through a detail of the first assembly, namely through a pot;

FIG. 6 is a top view of a pot in accordance with FIG. 5;

FIG. 8 is a longitudinal section through another detail of the first assembly, namely a sleeve;

FIG. 9 is a top view of another detail of the first assembly, namely a switch disk;

FIG. 10 is a side view of the switch disk of FIG. 9;

FIG. 20 is an arrangement of the kick-down switch and of the safety switch, shown diagrammatically.

Figure 1:
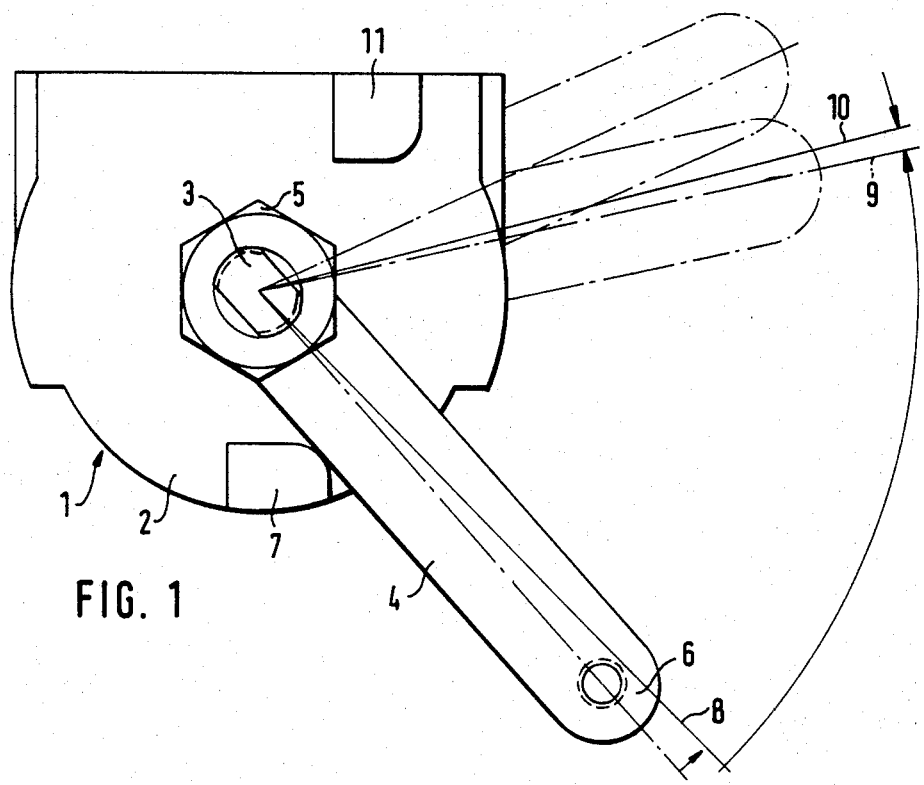
FIG. 1 is a top view of the bottom of the mounted position indicator.

In FIG. 1 a flattened end 3 of a drive shaft protrudes from a housing 1, namely from its bottom 2, the drive shaft being provided with a thread. A swing arm 4 is placed on the flattened end 3 and secured by a screw 5. At the opposite end of the swing arm 4 a ball head 6 extends from the swing arm, it being adapted for coupling the position indicator to a gas pedal. In the position shown in solid line, the swing arm 4 is in the idling position and is pressed by return springs against a first stop 7 developed out of the bottom of the housing 1. The swing arm 4 can be moved in counterclockwise direction by actuating the gas pedal. When the swing arm 4 is in the position indicated by a center line 8 of the swing arm, a safety switch is actuated. The safety switch remains in actuated position over the further range of swing of the swing arm. In the position indicated by the dot-dash center line 9 the full-load position of the swing arm 4 is reached. The swing arm 4 can be moved still further to a kick-down position (solid center line 10) wherein a kick-down switch is closed. The swing arm 4 can in no case be swung beyond a second stop 11.

Figure 2:
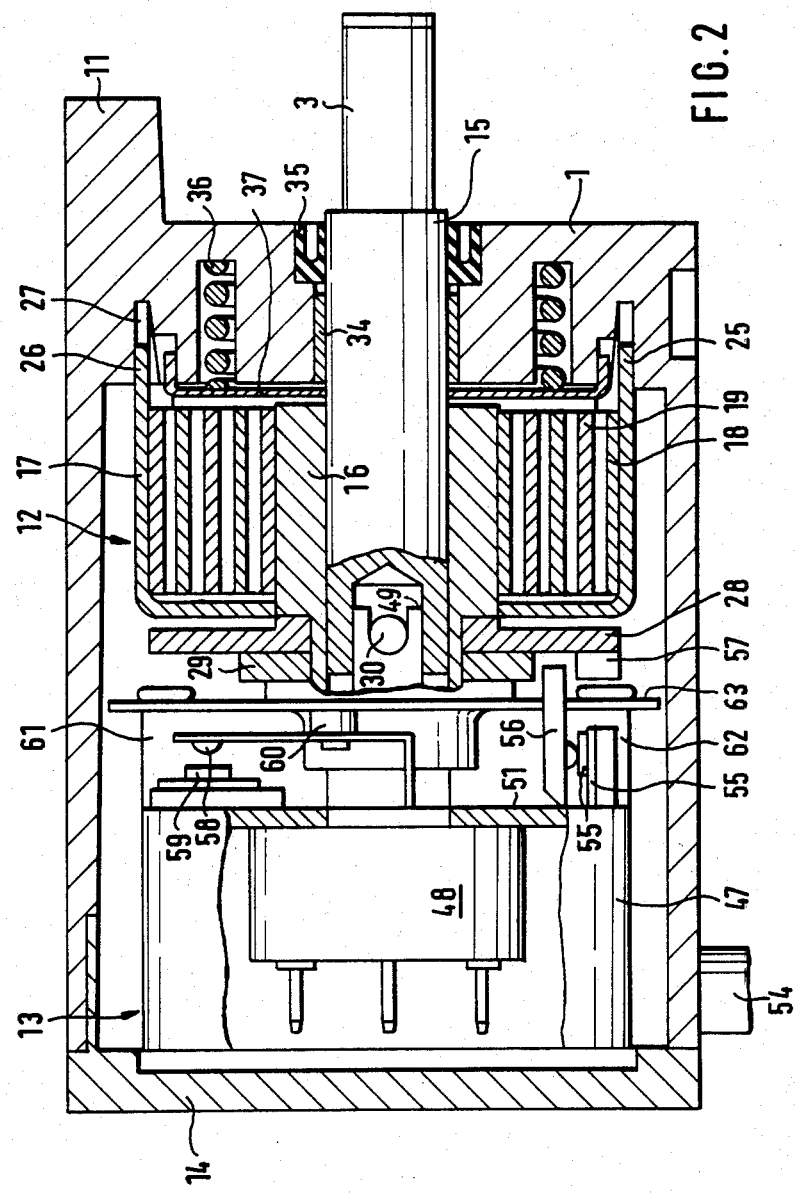
FIG. 2 is a longitudinal section through the mounted position indicator (without swing arm)
Figure 11:
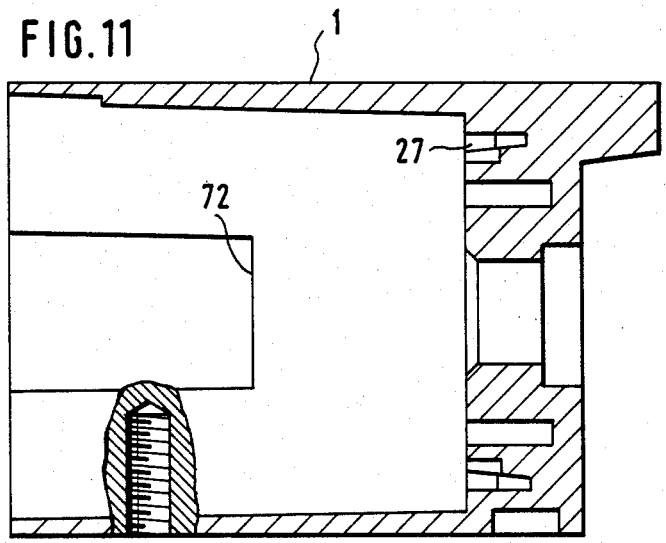
FIG. 11 is a housing seen in longitudinal section.

In FIG. 2, in a longitudinal section through the housing 1, a first mechanical assembly is designated generally by 12 and a second electrical assembly generally by 13. The inside of the housing 1 which contains these assemblies is closed by a cover 14.

The first assembly 12 comprises the drive shaft 15, a sleeve 16 placed on it and a pot 17 which is open at one end. The pot serves to receive two flat-band spiral springs as return springs 18, 19, which for reasons of safety are provided in pairs. One end of the return springs 18, 19 extends into respective slots 20 and 21 on an inner section of the sleeve; see also FIG. 8. The respective opposite ends of the return springs 18, 19 are each hooked into a slot 23, 23', respectively, in a wall surface 24 of the pot 17. FIGS. 3, 5 and 6 show the slot 23 of the pot 17 and the corresponding slot 23' provided in the opposite wall of the pot 17. From FIGS. 5 and 6 it can furthermore be noted how, in the extension of the wall surface 24, two serrated sections 25 and 26 protrude from it. The serrated sections 25, 26 can be inserted into a structured groove 27 in the inside bottom of the housing 1 so that the sections 25, 26 hold the pot 17 fast in circumferential direction in opposition to the returning force of the return springs 18, 19.

Figure 7:
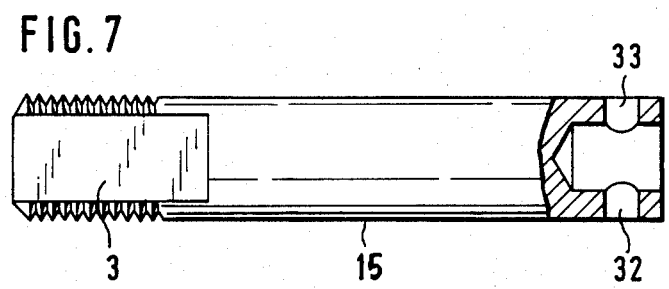
FIG. 7 is a side view of another detail of the first assembly, namely the drive shaft, partially in section.

A switch disk 28 and a disk 29, in particular a snap ring, can furthermore be applied on the outer section of the sleeve 16 in order to fix the switch disk 28 in position axially. The drive shaft 15, the sleeve 16 and the switch disk 28 can be connected by a hole-pin attachment with a pin 30 to form the first assembly 12. The development of the drive shaft 15 in the region of its connection to sleeve 16 in axial bore 31 (FIG. 8), and its radial bores 32, 33 can be noted from FIG. 7. The pin 30 passes through aligned bores 32a, 32, 33, 33a.

The first assembly 12 can be inserted into the bottom 2 of the housing 1 with the drive shaft 15. The drive shaft 15 is turnable in a bearing 34 and is sealed by a radial seal 35.

In the embodiment shown in FIG. 2, a spring 36 presses the first assembly 12 via a friction disk 37 to the left so as to assure a desired alignment with respect to the second assembly 13.

The second variant of the first assembly shown in FIGS. 3, 4 and 8 differs from that of FIG. 2 substantially by a different development of the sleeve in the region of the outer section 38 (see FIG. 8) and by a different development of the means for the axial alignment of the first assembly 12.

In accordance with FIG. 8 a collar 39 is arranged on the sleeve 16 between the inner section 22 and the outer section 38. Against this collar 39 there rests a cup spring 40 (see FIG. 3) which presses the bottom of the pot 17 against the switch disk 28a via an interposed friction disk 41. The switch disk 28a is fixed in axial direction by a snap ring 29a which engages into a groove 42 in the outer section 38.

The switch disk 28a is held in circumferential position by the pin 30 which extends into radial recesses 43, 44 in the switch disk 28a (see FIGS. 4 and 9).

Adjoining the axial bore 31 of the sleeve 16 for the reception of the drive shaft 15, the sleeve 16 is developed with a taper 45 the outer circumference and inner circumference of which cooperate with elements of the second assembly 13.

From FIGS. 9 and 10 which show the switch disk 28a on an enlarged scale there can be furthermore noted two tongues 46 and 47a which are bent upward at an acute angle and are provided, in combination with a flat spring which will be described below, for actuating the kick-down switch. Finally, a cam 57 for actuating a safety switch is embedded in the switch disk (FIGS. 3 and 4).

Figure 13:
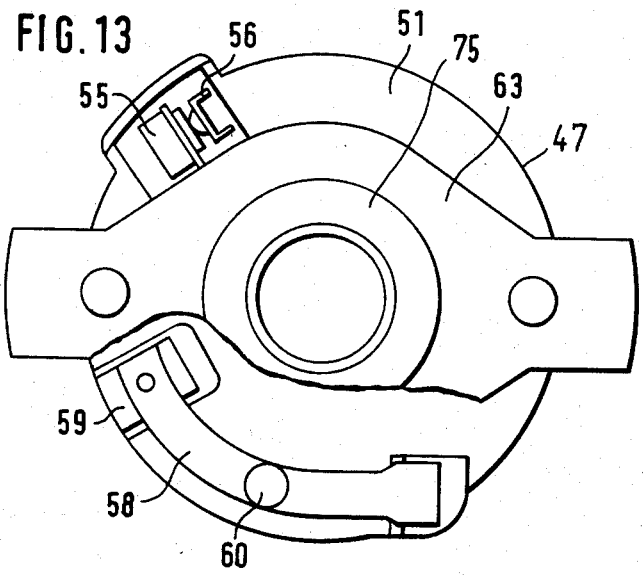
FIG. 13 is a top view of a second electrical assembly, in a simplified showing.
Figure 14:
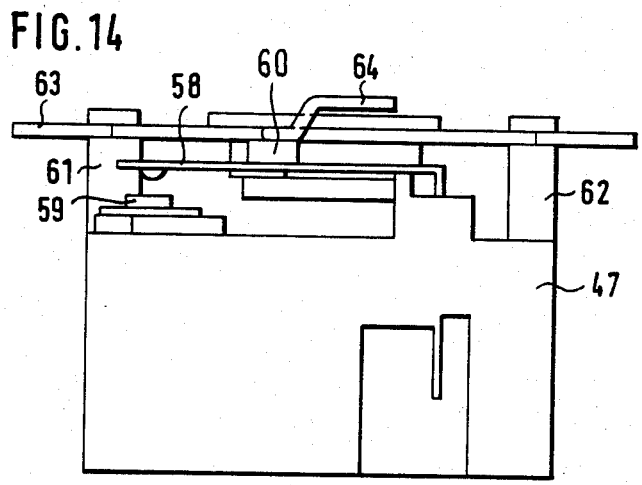
FIG. 14 is a side view of the second assembly shown in FIG. 13.

The second assembly, the electrical assembly 13, will be described below, it being shown in FIG. 2 as well as in FIGS. 13 and 14.

Figure 18:
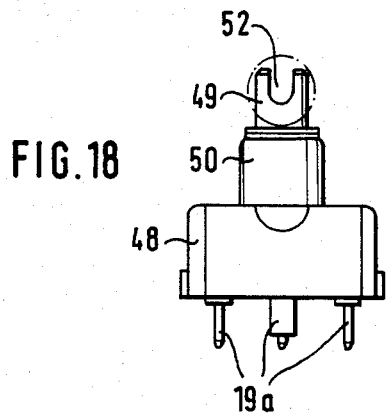
FIG. 18 is a rotary resistor which can be inserted into the second assembly, seen in side view.

The electrical assembly comprises essentially an insulating base 47 of an approximately parallelepiped shape (not shown in the drawing) into which the housing (of similar parallelepiped shape) of a rotary resistor 48 can be inserted. In this connection a setting shaft 49 and a bushing 50 of the rotary resistor 48 extend through a central opening in a face 51 of the base 47. The setting shaft 49 is developed as a shoe 52 for coupling with the hole-pin attachment with the pin 30 of the first assembly. The development of the rotary resistor 48 can best be noted from FIG. 18.

Figure 19:
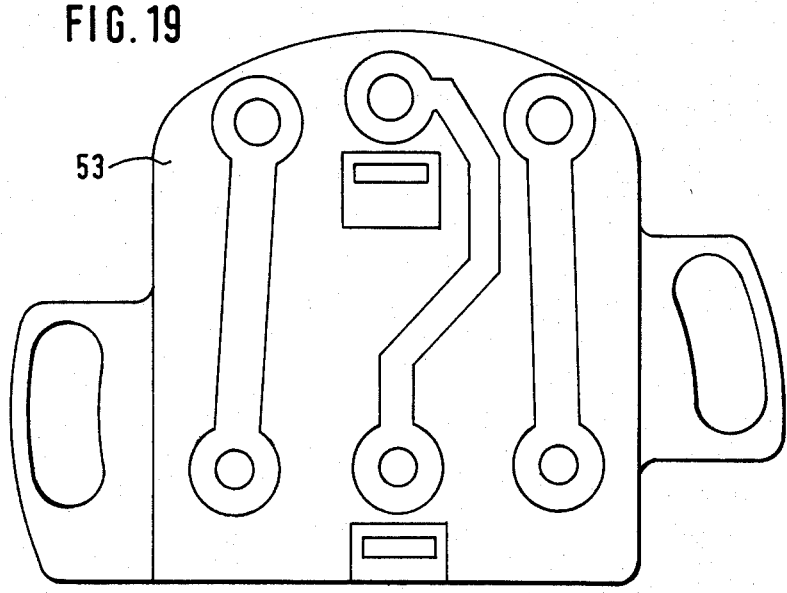
FIG. 19 is a top view of a circuit board which can be placed on the rotary resistor.

A circuit board 53 (FIG. 19) can be pushed over contact pins 19a of the rotary resistor 48. The circuit board 53 serves to make the connection between the rotary resistor 48 and a cable 54 (FIG. 2) which is conducted out of the housing 1.

In the face 51 of the insulating base 47 there are furthermore recessed—axially oriented—contact springs 55 and 56 (FIG. 2) of the safety switch. The contact spring 56 after final assembly can be actuated by a cam 57 (FIG. 2) in circumferential direction, the cam being arranged on the switch disk 28.

Contact springs 58 and 59 of the kick-down switch are furthermore held in the face 51 of the insulating base 47. In this connection the contact spring 58 extends in circumferential direction parallel to and spaced from the front side in such a manner that it can be actuated by an axial movement. For this purpose the contact spring 58 is provided on its outer side with a plastic spacer 60.

Figure 17A:
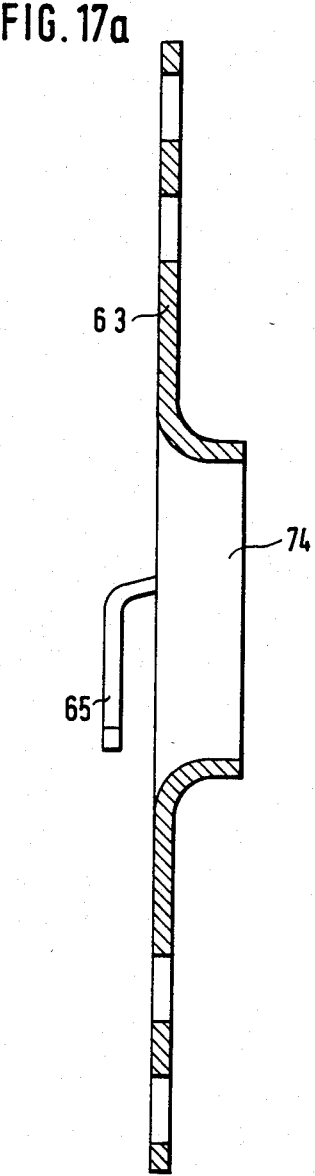
FIG. 17a is a side view of the spring washer.
Figure 15:
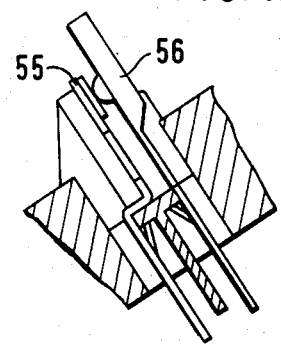
FIG. 15 shows a detail, namely a safety switch from FIGS. 13, 14.
Figure 16:
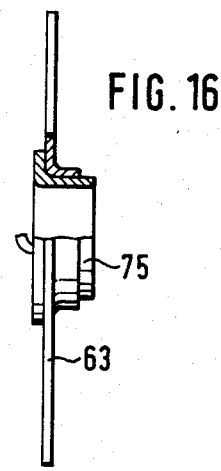
FIG. 16 is another detail from FIGS. 13, 14, namely an assembled spring washer in side view.
Figure 17:
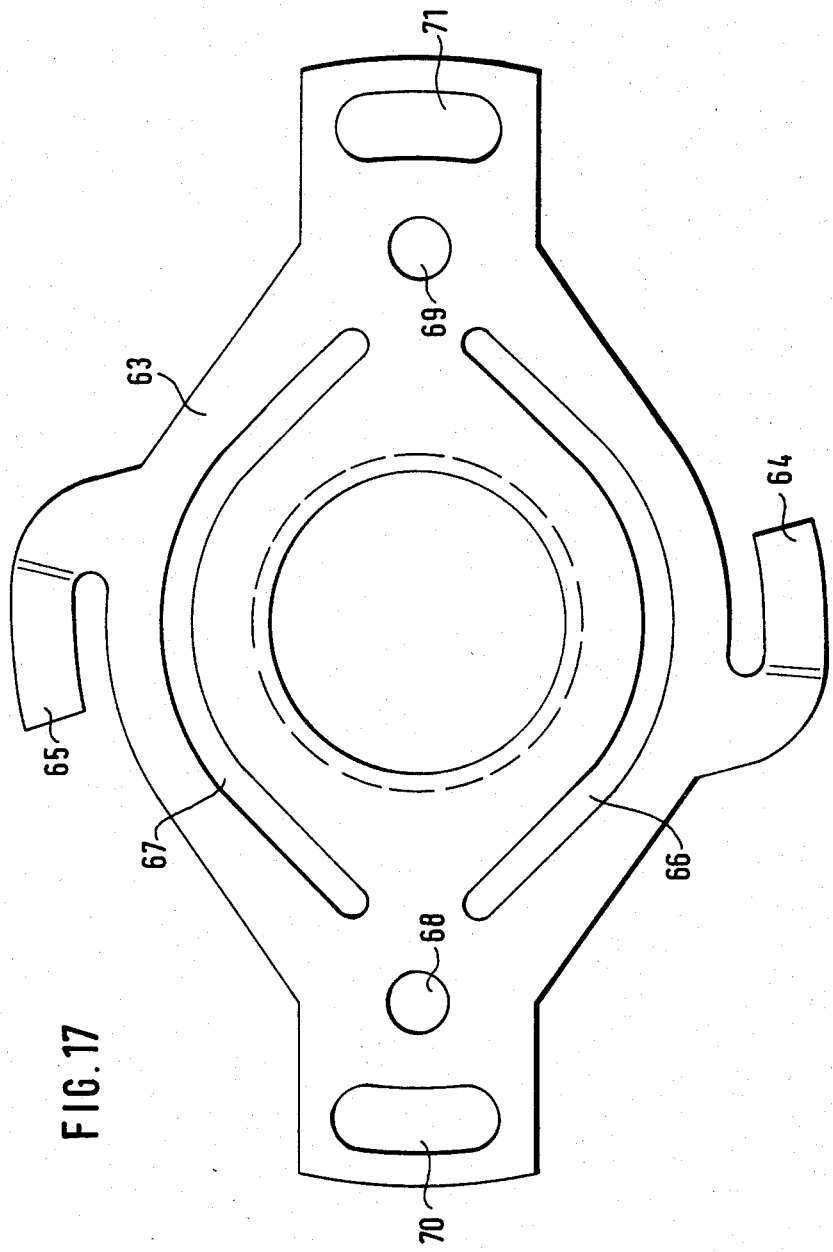
FIG. 17 is a top view of the spring washer.

A spring washer 63 is fastened on extensions 61 and 62 which protrude from the front side of the insulating base 47. The spring washer 63 is shown in mounted condition in FIGS. 2, 13 and 14, in simple assembled condition in FIG. 16, and in detail in FIGS. 17, 17a on a larger scale.

Figure 12:
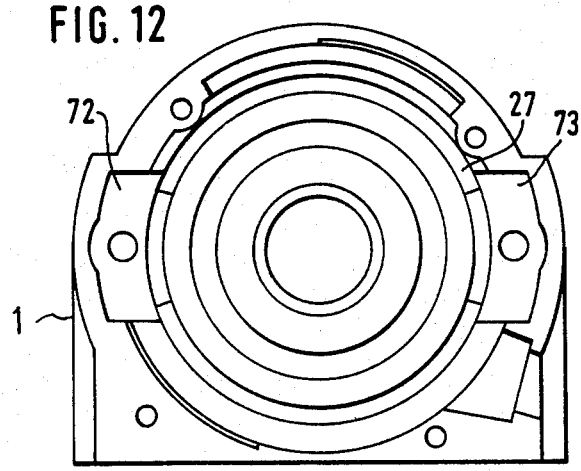
FIG. 12 shows the housing in a view from the cover side towards the inside.

Of essential importance in connection with the spring washer 63 are two extensions 64, 65 which are bent twice at a right angle and spaced axially from the first bent portions, the extensions 64, 65 lying radially opposite each other. The part of the spring washer 63 which bears the angularly bent extensions 64, 65 is substantially separated from the central part of the spring washer 63 by longitudinal slots 66 and 67 in order to provide better resiliency properties. The spring washer 63 furthermore has holes 68, 69 for attachment to the insulating base 47 as well as slots 70 and 71 for attachment in inner projections 72, 73 of the housing 1 (see FIG. 12). A bushing 75 is pressed into a central opening 74 of the spring washer 63 (see FIGS. 16a, 17a) the bushing being dimensioned to receive the taper 45 of the sleeve 16 shown in FIG. 8.

The angularly bent extensions 64 and 65 serve to assure the axial position of the first assembly 12 to the second assembly 13 in the mounted condition in the manner that the extensions 64, 65 come to rest against the switch disk 28. Aside from this, the extensions 64, 65 are adapted to be pressed in the direction towards the spring washer 63 by the bent tongues 46, 47a of the switch disk 28a when the switch disk 28a is turned into the kick-down position. In this way the portion of the spring washer 63 adjoining the bent extensions 64, 65 is pressed via the plastic spacer 60 against the contact spring 58 and the kick-down switch is closed.

After the first mechanical assembly 12 and the second electrical assembly 13 have been premounted and tested, they are used for the final mounting in the following manner:

First of all, the first mechanical assembly 12 is inserted into the housing 1 so that the flattened end 3 of the drive shaft 15 extends out of the radial seal 35. Before the serrated sections 25, 26 engage into the structured groove 27, the pot 17 is so turned, while holding the drive shaft fast, that the desired force of return from the idle position by the return springs 18, 19 is obtained. For this purpose the drive shaft 15 can be held fast by the swing arm against the stop 7 associated with the idle position.

When the return force has been adjusted in this manner, the second electric assembly 13 is pushed coaxially to the first assembly 12 into the inside of the housing 1 in such a manner that the taper 45 of the sleeve 16 extends into the bushing 75 and the shoe 52 of the setting shaft 49 surrounds the pin 30 of the hole-pin attachment within the drive shaft 15. In this way a rotary connection between the drive shaft 15 and the setting shaft 49 is produced. The second electrical assembly 13 can now be screwed fast through the slots 70 and 71 of the spring washer 63 to the projections 72 and 73 within the housing 1, as a result of which the first mechanical assembly 12 is fixed axially in position at the same time by means of the bent extensions 64, 65 of the spring washer 63.

The actuation of the safety switch and of the kick-down switch by the switch disk 28, is shown diagrammatically in FIG. 20.

Upon a movement of the switch disk 28, 28a in the direction indicated by the arrow 79, the cam 57 first of all moves away from the contact spring 56 of the safety switch so that the safety switch closes under the force of the contact spring 56. Thereupon, upon further turning of the switch disk 28, 28a at first no further switching action takes place. Only after the kick-down position has been reached does the bent tongue 46 and the tongue lying opposite it on the switch disk 28 strike against the bent extension 64 and the opposite extension 65 on the spring washer respectively. The bent extension 64 presses against the plastic spacer 60 and thus against the contact spring 58 which is thereby moved into the closing position with respect to the contact spring 59. In the last-mentioned process a considerable increase occurs in the resistance to be overcome by the gas pedal as a result of the bending back of the bent extensions 64 and 65.

Upon the resetting of the switch disk 28 in the direction opposite the direction of the arrow 79 by the force of the return springs 18, 19 the kick-down switch is first of all opened with the kick-down springs 58, 59 while the safety switch remains closed until the cam 57, shortly before the idle position, moves the contact spring 56 in FIG. 20 away to the right from the contact spring 55.

During the turning of the switch disk 28 which has been described the rotary resistor supplies an electric signal—a voltage—the characteristic of which corresponding to the characteristic of the rotary resistor 48 is preferably proportional to the deflection of the swing arm 4.

The friction disk 37 in FIG. 2 or 41 in FIG. 3 due to its frictional application has the result that at constant speed, upon which the foot pressure and the opposing spring force of the return springs 18, 19 are the same, fluttering as a result of vibrations resulting from the travel is avoided. Only a large difference in force between pedal force and return force, which occurs, for instance, by reduction in the pedal force, overcomes the frictional force and leads to the displacement of the position indicator.

The spring force of each individual return spring 18 and 19 is in any event so great that it overcomes the frictional force. Thus assurance is had that in case of a failure of one of the return springs 18 or 19 the other return spring will still assure the reliable resetting of the position indicator.

We claim:

1. In a position indicator couplable to a gas pedal for controlling the speed of travel of an automotive vehicle by electric correlation of the movement of the gas pedal to an element which controls the fuel/air mixture, having a housing with a substantially cylindrical hollow inner space within which a rotary resistor is arranged, the rotary resister having two parts relatively movable with respect to each other, one part of the rotary resistor being secured against turning, in a mount which is fastenable to the housing while the other part of the rotary resistor is connected with a member which is mounted turnable in the cylindrical hollow inner space about an axis and is turnable against a force of at least one return spring by the gas pedal and is provided with actuating means for actuating an electric kick-down switch, having contacts and being connected with the housing, in the axial direction upon the turning of said member by a predetermined amount, the improvement wherein a first assembly comprises a drive shaft,
    means for coupling the drive shaft with the gas pedal,
    a pot through which the drive shaft passes, said pot having a slot and receiving the return spring,
    said return spring having opposite ends and being turnable with respect to said pot, one end of the return spring extending into the slot of the pot and the other end of the return spring being connected with the drive shaft,
    the drive shaft having one end disposed in said housing and coupled to the turnable part of the rotary resistor, the turnable part having a setting shaft and the rotary resistor having a first portion surrounding the setting shaft,
    means comprising a switch disk for actuating the kick-down switch contacts, said switch disk is movable with said end of the drive shaft,
    a second assembly comprises a hollow insulating base having a hollow space receiving the non-turnable part of the rotary resistor in non-turnable manner and having an end portion acting as a support for the contacts of the kick-down switch wherein one of the contacts is actuatable by the switch disk and protrudes from the end portion of the insulating base,
    a spring washer with a central bushing arranged such that the first portion of the rotary resistor is inserted through the end portion of the insulating base,
    the second assembly by means of the setting shaft is connected coaxially with the drive shaft in the housing, the first assembly being inserted in the housing and restrained from turning in the housing by the return spring, and
    said housing has an opening, the drive shaft having a first section passing through said opening in the housing.

2. The position indicator as set forth in claim 1, wherein
    the drive shaft is coupled to the turnable part of the rotary resistor in the axial direction.

3. The position indicator as set forth in claim 1, wherein
    the spring washer is formed with at least two extensions having first and second bend portions, each bent at a right angle such that the second bend portion is spaced axially from the first bent portion to enable the extensions to rest against the switch disk in order to fix the axial position of the first assembly,
    one of the extensions having a predetermined arrangement in a circumferential direction relative to the axis and with respect to one of the kickdown switch contacts, and
    the switch disk has a tongue disposed such that in one axial position of the one end of the drive shaft said tongue actuates the contact spring, and
    the restoring force of the return spring is increased as said one end of said drive shaft moves to said one axial position.

4. The position indicator as set forth in claim 3, wherein
    the switch disk has two outwardly bent tongues bent at an acute angle for respective engagement with the extensions of the spring washer in a condition when the drive shaft is in a predetermined axial kick-down position.

5. The position indicator as set forth in claim 1, wherein
    an inner wall of the housing has protruding parts, and
    the spring washer has slots for fastening the second assembly to the protruding parts of the inner wall of the housing.

6. The position indicator as set forth in claim 1, wherein
    the housing has a bottom inner surface with a structured groove, and
    the pot has a wall surface and an extension of the wall surface with at least one serrated section which is engageable, in adjustable rotary position relative to the housing, in the structured groove.

7. The position indicator as set forth in claim 1, further comprising
a sleeve receiving the drive shaft and having an inner section with at least one slot, the sleeve being arranged in the pot with the return spring, one end of the return spring extended into the slot, the sleeve having an outer section for accommodating the switch disk and having a taper,
the spring washer having a first bushing and the taper of the sleeve being insertable into the first bushing of the spring washer and being turnable in said first bushing,
the rotary resistor having a second bushing insertable into the taper at one end of the sleeve with the setting shaft, and
the drive shaft is inserted into the other end of the sleeve, and
a pin connects the sleeve, the drive shaft and the switch disk together, said pin extending radially through the sleeve and protruding out of said sleeve..

8. The position indicator as set forth in claim 7, further comprising
a shoe formed at the setting shaft, and the pin is coupled with the shoe upon insertion of the setting shaft into the sleeve.

9. The position indicator as set forth in claim 7, wherein
said pot has a bottom portion, and
the sleeve has a collar between the inner section and the outer section,
a cup spring is disposed against said collar biasing a bottom of said pot against the switch disk,
an end of the outer section extending away from the collar is formed with a groove, and
a snap ring is inserted into said groove so as to fix the axial position of the switch disk.

10. The position indicator as set forth in claim 9, further comprising
a friction disk disposed between the bottom of said pot and said switch disk.

11. The position indicator as set forth in claim 1, wherein
the mount has a front portion,
the switch disc includes a cam, and
a safety switch having contacts is supported on the insulating base,
one of the safety switch contacts protrudes axially from the front portion of the mount, the protruding contact being adapted to be actuated by the cam upon movement of the cam in a circumferential direction.

12. The position indicator as set forth in claim 1, wherein
the insulating base has a front face with extensions formed thereon, and
the switch disk is supported on the extensions.

13. The position indicator as set forth in claim 1, wherein
the insulating base has an approximate parallelepiped recess, the rotary resistor being of complementary parallelepiped shape to and is received in said recess.

14. The position indicator as set forth in claim 1, further comprising
a circuit board on the rotary resistor in the insulating base.

15. The position indicator as set forth in claim 1, wherein
said element which controls the fuel/air mixture is a throttle valve.

* * * * *

UNITED STATES PATENT AND TRADEMARK OFFICE
CERTIFICATE OF CORRECTION

PATENT NO. : 4,505,151
DATED : March 19, 1985
INVENTOR(S) : Wolfgang Sauerschell, et al It is certified that error appears in the above–identified patent and that said Letters Patent are hereby corrected as shown below:

Column 9, Line 44 (claim 1) "resister" should read --resistor--

Signed and Sealed this

Twenty-seventh Day of August 1985

[SEAL]

*Attest:*

DONALD J. QUIGG

*Attesting Officer*  *Acting Commissioner of Patents and Trademarks*